United States Patent [19]
Weischedel et al.

[11] 3,743,916
[45] July 3, 1973

[54] REGULATED CONVERTER CIRCUIT WITH PULSE WIDTH MODULATION CIRCUIT USING PASSIVE COMPONENTS

[75] Inventors: Herbert Rudolf Weischedel, Rockaway; George Raymond Westerman, Denville, both of N.J.

[73] Assignee: Bell Telephone Laboratories, Incorporated, Murray Hill, N.J.

[22] Filed: July 13, 1972

[21] Appl. No.: 271,396

[52] U.S. Cl..................... 321/2, 321/18, 331/113 A
[51] Int. Cl. ............................................ H02m 3/32
[58] Field of Search .................. 321/2, 18; 331/111, 331/113 A

[56] References Cited
UNITED STATES PATENTS

| | | |
|---|---|---|
| 2,963,658 | 12/1960 | Rochelle............................ 321/2 X |
| 3,602,801 | 8/1971 | Williamson .............................. 321/2 |
| 3,350,661 | 10/1967 | Bloom et al. ......................... 321/2 X |
| 3,439,251 | 4/1969 | Schaefer.............................. 321/2 X |
| 3,601,680 | 8/1971 | Beckwith................................ 321/2 |

Primary Examiner—William H. Beha, Jr.
Attorney—W. L. Keefauer

[57] ABSTRACT

A DC to DC converter utilizes oppositely phased feedback networks having passive components to sustain the converter oscillations and modulate the oppositely phased switching devices. Regulation is achieved by modifying the residual charges on the storage components in the feedback networks. Signal dissymmetry in the converter switching devices is counteracted by controlling the balance of the residual charge level of the storage devices in the oppositely phased feedback networks.

7 Claims, 2 Drawing Figures

REGULATED CONVERTER CIRCUIT WITH PULSE WIDTH MODULATION CIRCUIT USING PASSIVE COMPONENTS

BACKGROUND OF THE INVENTION

This invention is related to DC to DC converter circuits and more particularly to a converter circuit with a feedback network to sustain oscillation. The invention is specifically concerned with a regulated DC to DC converter circuit wherein the switching devices of the converter have their duty cycle controlled.

Regulated double ended converter circuits, which regulate the signal output by modulating the duty cycle of the oppositely phased converter switching devices, normally require complex feedback circuit arrangements. These feedback circuit arrangements generally include gating and logic circuits which require many semiconductor switching devices. Many of these semiconductor components have to have very finely defined characteristics to maintain a balance of signals in the converter switching devices. If the bias signals driving the converter swiching devices tend to become unbalanced, the resulting unequal current flow into the converter power transformer primary may cause the magnetic core thereof to saturate. The peak current flow in the switching devices resulting from saturation places a severe strain on the switching devices and may even cause device failure. Generally complex logic circuits are used to drive the switching devices because feedback circuits with passive components more readily permit the bias signals to become unsymmetrical, thereby allowing the magnetic components of the converter circuit to saturate.

It is, therefore, an object of the invention to regulate the voltage output of a converter by modulating the duty cycle of the switching devices with a feedback network comprising passive components.

It is another object of the invention to automatically balance the bias signals in a passive feedback network of a converter so that the bias signals during alternate half cycles are symmetrical.

It is yet another object of the invention to utilize a passive feedback network in a converter circuit to sustain the oscillations of the converter switching devices.

SUMMARY OF THE INVENTION

Therefore, in accord with the invention, a regulated converter has a feedback circuit utilizing passive components which modulates the duty cycle of the switching devices. This feedback circuit also sustains the oscillations of the converter switching devices and corrects dissymmetries of the bias signals applied thereto. The feedback circuit for each switching device comprises paired RC charging networks. Each of the capacitors in the paired RC charging networks is charged by opposing voltages derived from the opposite terminals of a tertiary winding wound on the converter's power transformer. If the symmetry of the bias signals is distorted, a DC voltage component appears on the appropriate capacitor to restore the symmetry of the oppositely phased bias signals.

By balancing the oppositely phased bias signals the magnetic components of the converter are more likely to operate within the linear region without saturating. The converter circuit is also self-starting and has a signal injected into the feedback network to permit instant starting of the alternate switching of the switching devices.

BRIEF DESCRIPTION OF THE DRAWINGS

The many features and advantages and the principles of the operation of the invention may be readily ascertained by reference to the following detailed description and the accompanying drawings, in which.

DETAILED DESCRIPTION

Figure 1:
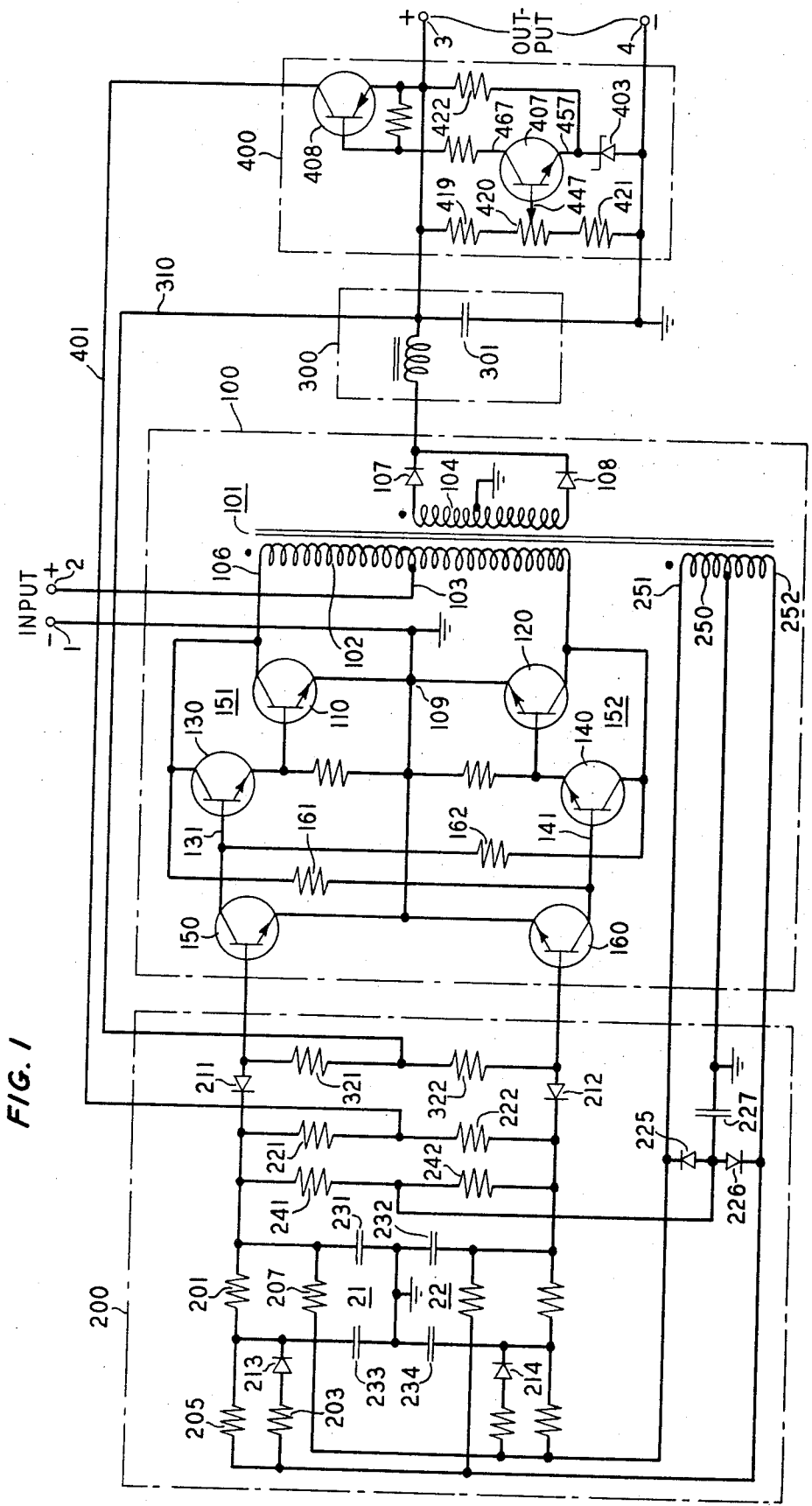
FIG. 1 is a schematic of a regulated converter circuit with a passive feedback network to modulate the switching devices in accordance with the invention.

The self-oscillating converter circuit shown in FIG. 1. has a feedback circuit comprising passive components. This feedback circuit regulates the output of the converter by controlling the duty cycle of the converter switching devices. The converter circuit comprises a power stage 100, a feedback circuit 200, an output filter 300 and an error detector circuit 400.

The power stage 100 comprises two Darlington connected switching devices 151 and 152. The switching device outputs are connected to the primary winding 102 of the converter power transformer 101. The Darlington connected siwtching devices 151 and 152 are driven by the base drive transistors 150 and 160. As described below, the alternate conduction of the switching devices generates a square wave in the primary winding 102 which is coupled to the secondary winding 104 of the transformer 101. The square wave signal across winding 104 is rectified by the rectifying diodes 107 and 108 and transmitted, via the output filter 300, to the output terminals 3 and 4.

The feedback circuit 200 comprises two oppositely poled RC charging networks 21 and 22 and the diodes 213 and 214 to control the relative charging and discharging rates of the storage devices therein. The feedback circuit 200 is connected to the teritary winding 250 which is wound on the core of the converter transformer 101. The error detector circuit 400 is shunted across the output terminals 3 and 4 and generates an error signal which is transmitted, via lead 401, to the charging networks of the feedback circuit 200.

The principles of the invention may be readily understood by describing the operation of the feedback circuit 200 in regulating the output signal and correcting for dissymmetry of the alternately phased bias signals. For the purposes of explanation, assume that the driving transistor 150 is nonconducting and the driving transistor 160 is conducting. Since the driving transistor 160 is conducting, it diverts the base drive current away from the base 141 of transistor 140 and renders the Darlington pair 152 nonconducting. The oppositely phased Darlington pair 151, comprising the transistors 110 and 130, is conducting. Since the transistor 110 is conducting, the center terminal 103 of the primary winding 102 of the power transformer is positive with respect to terminal 106. The polarity of the transformer windings of transformer 101 are indicated by the dot notation as shown on FIG. 1.

With terminal 103 positive and terminal 106 negative, a positive voltage is induced at the terminal 252 of the tertiary winding 250. This positive voltage is shown by the waveform portion 40a of the waveform 40 in FIG. 2. At the same time, the terminal 251 of the winding 250 assumes a negative polarity as shown by the waveform portion 10a of waveform 10 in FIG. 2. The voltage appearing at terminals 251 and 252 is rectified by the diodes 225 and 226 and stored on the capacitor 227. The resulting negative voltage stored on the capacitor 227 is coupled, via the resistors 241 and 252, to the charging networks 21 and 22. This negative voltage is utilized to assist in discharging positive charge stored on the capacitors 231, 232, 233 and 234.

The negative voltage at the terminal 251 is coupled, via a resistor 207, to a capacitor 231 in the charging network 21. The current flowing through the resistor 207 charges the capacitor 231 negative as shown by waveform portion 30a of waveform 30 in FIG. 2 during the time period $t_1$. This negative bias signal is coupled, via the diode 211, to the base of the transistor 150. The negative charge on the capacitor 231 is utilized to bias the transistor 150 further into its cut-off state.

Figure 2:
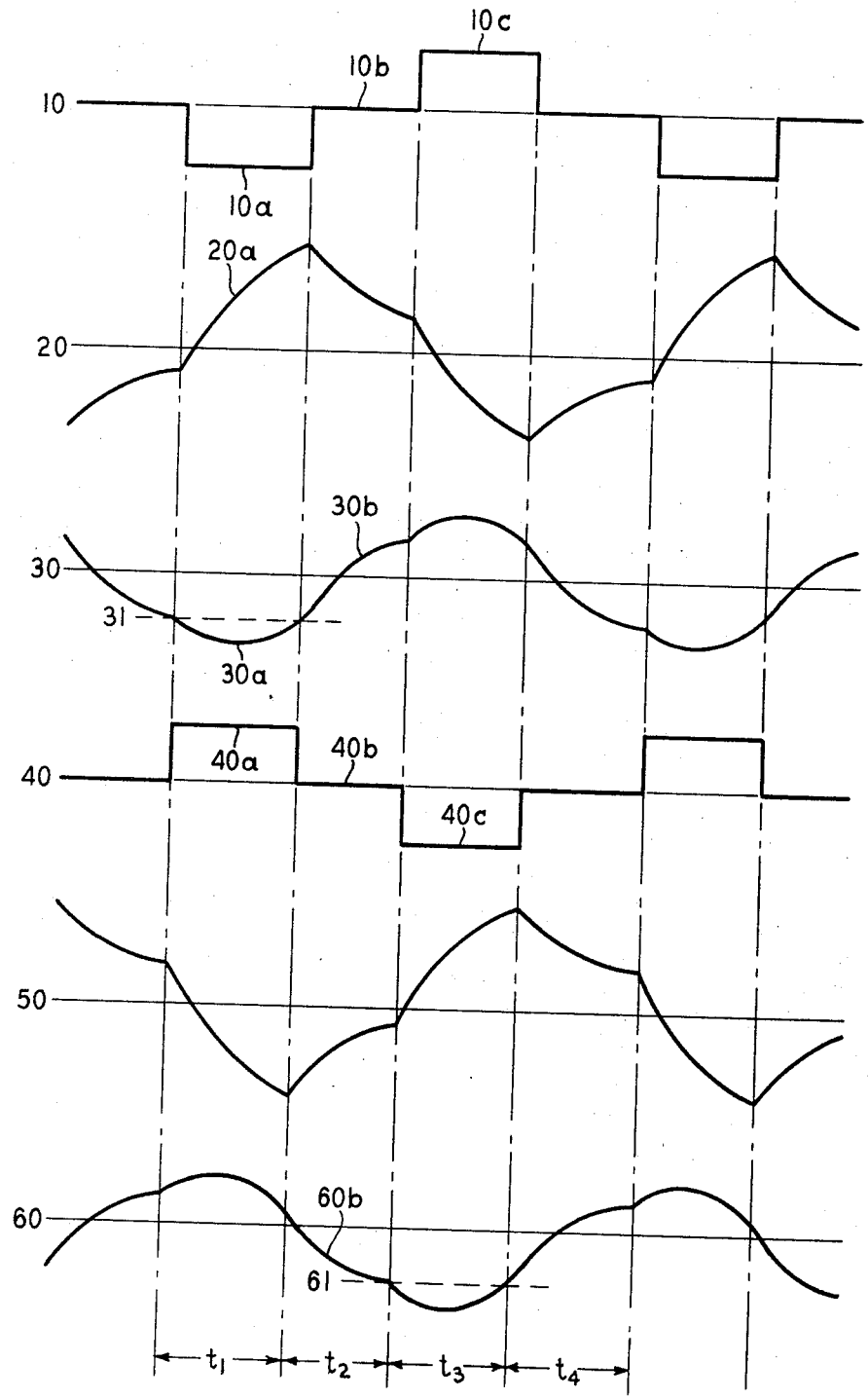
FIG. 2 discloses voltage waveforms to assist in explaining the operation of the circuit shown in FIG. 1.

The positive voltage appearing at the winding terminal 252 and shown by waveform portion 40a of waveform 40 in FIG. 2 is applied to the capacitor 233 via a resistor 203 and a diode 213 and the parallel path resistor 205. This positive voltage charges the capacitor 233 positively as shown by the waveform portion 20a of waveform 20 in FIG. 2. As indicated in FIG. 2, the waveform portion 20a increases positively to the transition point between the adjacent time periods $t_1$ and $t_2$. As this voltage charges the capacitor 233 more and more positively, a current begins to flow through the resistor 201 to the capacitor 231. This current supplies a positive charge to counterbalance the negative current being supplied through the resistor 207. Near the midpoint of time period $t_1$, the positive current through the resistor 201 becomes greater than the negative current through resistor 207 and the voltage on the capacitor 231 starts to swing in a positive direction as indicated by the waveform portion 30a of waveform 30 in FIG. 2.

As soon as the voltage shown by waveform portion 30b becomes positive with respect to the voltage level 32, shown in FIG. 2, the transistor 150 is forward biased and begins to conduct. The diode 211 is back biased, since a negative voltage is no longer applied thereto. The now conducting transistor 150 drains bias current away from the base 131 of the transistor 130 and, hence, the Darlington switching pair 152 is now biased nonconducting. The voltage at terminals 251 and 252 of winding 250 drops to zero as shown by the waveform portions 10b and 40b of waveforms 10 and 40, respectively, as shown in FIG. 2. At this time a negative bias current flows through the resistor 242 from the negative charge stored in capacitor 227 and discharges the capacitor 232 as shown by waveform portion 40b of waveform 60 in FIG. 2. When the voltage, as shown by waveform portion 60b, becomes more negative than the threshold level indicated by the level 61 in FIG. 2, the diode 212 is forward biased and the driving transistor 160 is biased nonconducting.

With the transistor 160 nonconducting, the Darlington pair 152 comprising the transistors 120 and 140 is now biased conducting. The voltage at the terminal 251 of the winding 250 is now positive and that of terminal 252 is now negative as shown by waveworm portions 10c and 40c of waveforms 10 and 40, respectively. The alternate switching cycle for the successive time periods $t_3$ and $t_4$, as shown in FIG. 2, operates in a similar manner to ahtat described above for the successive time periods $t_1$ and $t_2$. The charging capacitors 232 and 234 are charged in an identical manner as described above with reference to the charging of the capacitors 231 and 233. The dual charging arrangement described hereinabove advantageously permits more precise control of the charging time and phase shift to regulate the converter and sustain oscillations therein.

The converter circuit is rendered self-starting upon application of DC energy to input terminals 1 and 2 by virtue of the positive voltage supplied to the bases of the driving transistors 150 and 160 by the cross coupling resistors 161 and 162. Small dissimilarities in the Darlington connected switching devices 151 and 152 causes one device to be biased into the conducting state in advance of the other device. If, for example, the Darlington connected switching device 151 is biased into saturation first, the collector of transistor 110 is at the ground potential of terminal 109. Hence, the current flowing through resistor 161 rapidly decreases to zero and no bias current is supplied to the base 141 of transistor 140. Thus, the Darlington connected switching device 152 is biased into the nonconducting state as long as the Darlington connected switching device 151 is saturated. This condition continues until the core of the power transformer 101 saturates. At this time the Darlington connected switching device 151 is forced out of the saturated state returning bias current to the base 141 of transistor 140 and the Darlington connected switching device 152 is then biased into saturation. The alternate switching cycle operates in a similar manner to that described above with the cycle repeating until there is sufficient voltage developed across the output filter capacitor 301 to forward bias transistors 150 and 160 by a positive voltage supplied through the lead 310 and resistors 321 and 322. Switching of the Darlington connected switching devices 151 and 152 is now controlled by the network 200 as described hereinabove and transformer 101 no longer saturates.

The cross coupling resistors 113 and 114 also inhibit simultaneous conduction of the Darlington connected switching devices 151 and 152 during operation of the converter.

The signal output of the converter is regulated in response to error signals generated by the error detector circuit 400. The error signals are generated in response to the conductivity of the transistor 407. The base 447 of transistor 407 is connected to a voltage divider connected across the output terminals 3 and 4. The voltage divider comprises the series connected resistors 419, 420 and 421. The emitter 457 of the transistor 407 is connected to a zener diode 403 which is energized by current supplied, via resistor 422, from the output of the filter 300.

The signal output at the collector 467 of the transistor 407 is amplified by the transistor 408 and applied, via lead 401, and via resistors 221 and 222 to the paired charging capacitors 231, 233, and 232, 234, respectively, in the feedback network 200. The error signal alters the residual charge on the charging capacitors in order to control the charging time periods of the RC networks 21 and 22. The control of the charging time, in turn, controls the duty cycle of the switching transistors of the converter and, hence, permits regulation of the output signal.

As indicated hereinabove, the feedback network, in addition to regulating the output and sustaining oscillations, corrects for dissymmetry in the alternately phased bias signals. If dissymmetry of the bias signals occurs, the oppositely phased voltage at winding terminals 251 and 252 assumes different magnitudes due to unequal conduction of the Darlington connected switching devices 151 and 152. The unequal voltages at terminals 251 and 252 cause the voltages across capacitors 231 and 233 to have a different DC component. The orientation of these DC components tends to restore symmetry to the oppositely phased bias signals.

What is claimed is:

1. A DC to DC converter comprising a power stage including first and second switching devices, an output transformer and a feedback circuit responsive to said output transformer and connected to drive said switching devices, said feedback circuit including a tertiary winding on said output transformer and having first and second terminals;
   first, second, third and fourth charging capacitors;
   said first capacitor coupled to said first terminal and being connected to drive said first switching device;
   said second capacitor coupled to said second terminal and being connected to drive said second switching device;
   said third capacitor coupled to said second terminal and being coupled to said first capacitor to counter the charging thereof; and
   said fourth capacitor coupled to said first terminal and being coupled to said second capacitor to counter the charging thereof.

2. A DC to DC converter, as defined in claim 1, whereby said first and third capacitors are connected by a first charge transfer path and said second and fourth capacitors are connected by a second charge transfer path.

3. A DC to DC converter, as defined in claim 1, further including means to monitor the output voltage and compare it with a reference voltage;
   means to derive an error signal from the comparison signal; and
   means to apply said error signal to alter the residual charge of said first, second, third and fourth capacitors to restore the output voltage to its regulated value.

4. A DC to DC converter as defined in claim 1 further including first and second impedance paths to cross couple the input and output terminals of said first and second switching devices.

5. A DC to DC converter including at least one switching device, a power transformer and comprising means to regulate the voltage output thereof including a voltage regulation feedback circuit to sustain oscillations in said converter and drive said switching means;
   said feedback circuit comprising a voltage sensing tertiary winding in said power transformer;
   dual charging means coupled to drive said switching device comprising a first charging network including a first capacitive device connected to one terminal of said tertiary winding; and
   a second charging network including a second capacitive device connected to a terminal opposite said one terminal of said tertiary winding, wherein said first and second capacitve devices are charged to opposite voltage polarities, said first and second capacitive devices being coupled to discharge into each other and being coupled to drive said switching device.

6. A DC to DC converter, as defined in claim 5, further including a second switching device;
   a second dual charging means coupled to drive said second switching device and comprising a third capacitive device connectd to said opposite terminal of said tertiary winding; and
   a fourth capacitive device connected to the said one terminal of said tertiary winding wherein said third and fourth capacitive devices being coupled to discharge into each other and being coupled to drive said second switching device.

7. A DC to DC converter, as defined in claim 6, further including means to regulate the output voltage of said converter including a reference voltage source;
   means to compare the output voltage with said reference voltage and generate an error signal therefrom; and
   means to couple said error signal to said first and third capacitive devices to deposit charge therein to alter the bias signal level in order to regulate the output voltage.

* * * * *